United States Patent [19]

Beard

[11] Patent Number: 5,726,937
[45] Date of Patent: Mar. 10, 1998

[54] FLASH MEMORY SYSTEM HAVING MEMORY CACHE

[75] Inventor: Paul Beard, Milpitas, Calif.

[73] Assignee: Norand Corporation, Cedar Rapids, Iowa

[21] Appl. No.: 653,377

[22] Filed: May 21, 1996

Related U.S. Application Data

[63] Continuation of Ser. No. 372,201, Jan. 12, 1995, abandoned, which is a continuation-in-part of Ser. No. 302,128, Sep. 7, 1994, abandoned, which is a continuation-in-part of Ser. No. 240,039, May 9, 1994, abandoned, which is a continuation-in-part of Ser. No. 189,696, Jan. 31, 1994, abandoned.

[51] Int. Cl.$^6$ .................................................. G11C 13/00
[52] U.S. Cl. ............................................ 365/185.33; 365/218
[58] Field of Search .............................. 365/218, 185.33

[56] References Cited

U.S. PATENT DOCUMENTS

| | | | |
|---|---|---|---|
| 4,953,073 | 8/1990 | Moussouris et al. | 365/49 |
| 5,134,589 | 7/1992 | Hamano | 365/238.5 |
| 5,193,071 | 3/1993 | Umina et al. | 365/189.01 |
| 5,544,118 | 8/1996 | Harari | 365/200 |
| 5,548,554 | 8/1996 | Pascucci et al. | 365/200 |

FOREIGN PATENT DOCUMENTS

WO 94/27382  6/1994  European Pat. Off. .

OTHER PUBLICATIONS

Aaron Boxer "Where Buses Cannot Go"; IEEE Spectrum pp. 41–45 Feb. 1995.

*Primary Examiner*—Terrell W. Fears
*Attorney, Agent, or Firm*—Suiter & Associates PC

[57] ABSTRACT

The present invention discloses an electronic memory system having semipermanent memory storage, a memory device for rapid data transfer and temporary memory storage, and controller for monitoring and controlling writes to the semipermanent memory storage.

18 Claims, 2 Drawing Sheets

FLASH MEMORY SYSTEM HAVING MEMORY CACHE

CROSS-REFERENCE TO RELATED APPLICATIONS

The present invention is a continuation of U.S. Ser. No. 08/372,201, DN38053Y, filed Jan. 12, 1995, abandoned, which in turn is a continuation-in-part of U.S. Ser. No. 08/302,128, DN 38053B, filed Sep. 7, 1994, now abandoned, which is a continuation-in-part of U.S. Ser. No. 08/240,039, DN 38053A, filed May 9, 1994, now abandoned, which in turn is a continuation-in-part of U.S. Ser. No. 08/189,696, DN 38053, filed Jan. 31, 1994, now abandoned. Reference is hereby made to U.S. Ser. No. 08/428,856, filed Apr. 25, 1995, pending which is assigned to the same assignee as the present application.

The present invention may be utilized as memory storage means in various local area network devices such as a radio unit capable of participation on multiple local area networks as described in PCT WO 94/27382. The present invention may also be utilized as memory storage means in various local area network devices such as a data collection terminal having an integrated multiple input and output system as described in U.S. patent application Ser. No. DN 38075, filed Dec. 13, 1994, Express Mail Label Number TB 632 908 023 US by Alan Bunte et al.

All of the aforementioned applications are incorporated herein by reference.

TECHNICAL FIELD

The invention relates generally to flash memory storage devices in digital computer systems, and more particularly to an implementation of flash memory wherein the effective speed of the flash operational cycles is increased and wear on the flash memory is evenly distributed.

BACKGROUND ART

The most recent advances in semiconductor memory storage devices have occurred in flash memory. Flash memory is nonvolatile and therefore memory states are retained without the need for supplying power to the flash memory. Flash memory devices are rapidly replacing read only memory (ROM) chips in desktop applications, and because they will retain memory states without power, flash memory devices are becoming the alternative to electrically erasable and programmable read only memories (EEPROM). The nonvolatility characteristic makes flash memory devices ideal for applications in which low power consumption is an important design criterion, such as in portable computer and data terminal systems where flash memory is replacing hard disk drives as the main random access semipermanent memory storage device.

A current problem encountered in digital microprocessor applications is that the bandwidth (operating speed) of the microprocessors far exceeds the bandwidth of the random access memory devices. This bandwidth mismatch often places the microprocessor into an unproductive wait state wherein the microprocessor spends extra cycles waiting for the operation to be performed by the memory to be completed. Static random access memory (SRAM) devices have higher bandwidths than do dynamic random access memory (DRAM) devices but SPAMs are more costly and have lower memory densities than do DRAMs. It is for these reasons that DRAMs are preferred over SPAMs where cost and space are at a premium.

In order to improve the bandwidth of DRAM memory systems and thereby reduce the bandwidth gap between the microprocessor and the main random access memory, many designs employ SRAM devices and DRAM devices together in a circuit arrangement known as a cache hierarchy in order to maximize the respective advantages of both memory technologies. In cache hierarchy architecture, a small SRAM memory device is placed between the microprocessor and a large bank of DRAM memory devices. The SRAM acts as a memory buffer between the microprocessor containing information most frequently requested by the microprocessor that the SRAM can transfer to and from the microprocessor at a faster rate than the DRAM could do directly. Multiple variations of this cache hierarchy exist with different implementations designed to improve access time to the random access memory.

In applications where an entirely solid state memory device is desired as the main random access memory to be used in place of electromechanical memory storage devices, DRAM devices are used to implement a virtual RAM disk. However, DRAM memory is volatile and requires external power in order to preserve the saved memory states. The nonvolatility of flash memory makes it an ideal replacement to DRAM memory devices because no external power is required to maintain the memory contents of flash memory. Flash memory read access times are of the same order of magnitude as DRAM read access times, however flash write and erase speeds are much slower. Therefore cache hierarchy architecture with flash memory implementations is required even more so with flash memory than with DRAM memory.

The basic memory element in flash memory designs is a complementary metal oxide semiconductor (CMOS) transistor which is a subclass of field-effect transistors (FETs). The gate voltage on the flash transistor memory cell floats with respect to ground, that is the gate voltage is electrically isolated from the rest of the transistor circuit. To save a memory state to the flash memory cell (i.e. perform a write to the memory cell), the gate of the CMOS transistor is connected to the supply voltage, the source of the transistor is grounded, and the drain of the transistor is biased to an intermediate voltage, typically one half of the supply voltage. In this configuration, the drain of the CMOS transistor is at a higher voltage than the source of the transistor, and negatively charged electrons flow from the source to the drain. Since the gate is also at a positive voltage with respect to the source, some of the electrons flowing from the source to the drain will reach a high enough energy state to tunnel through the oxide layer barrier. These so called "hot" electrons remain on the floating gate, and therefore the threshold voltage required to turn on the transistor is increased.

In order to change the saved memory state (i.e. perform an erase of the memory cell), the reverse of the aforementioned write procedure is performed. To perform an erase the gate of the CMOS transistor is negatively biased with respect to the source of the transistor; typically the source is connected to the supply voltage and the gate is grounded. Thus the electrons that accumulated on the floating gate in the write process tunnel back again through the oxide layer in a process known as Fowler-Nordheim tunneling. This flash memory write and erase process is similar to that used in erasable programmable read only memory (EPROM) design, however the main difference between the two is that the oxide layer in the flash design is thinner than in the EPROM design in order to allow for the flash erase process to be accomplished electrically whereas the EPROM erase process requires exposure of the device to ultraviolet (UV) radiation in order to give the accumulated electrons enough energy to tunnel (Fowler-Nordheim tunneling) back through the EPROM's thicker oxide layer.

Because the flash memory cell CMOS transistor has a relatively thin oxide layer in order to allow for electrical memory erases, the tunneling process will eventually wear out the oxide layer of the flash CMOS transistor. Thus the lifetime of the flash memory device is limited to a certain number of write and erase cycles which typically range from 10,000 to 1,000,000 cycles. Additionally, the wear encountered on the oxide layer of the flash memory cell CMOS transistors is not evenly distributed across the entire flash memory array. If the flash memory device is used in random access applications such as a solid-state implementation of a hard disk drive, some of the flash memory cells will undergo more write and erase cycles than other cells causing some cells to wear out more rapidly than other cells, thereby wearing out the flash memory device and ending its useful life sooner than if the write and erase cycles had been more evenly distributed among all of the transistors in the flash memory array.

Flash memory chip manufacturers are designing flash memory devices that make the slow write and erase cycles less noticeable and that additionally distribute wear more evenly across the entire memory device. In addition there exist software and hardware implementations of flash memory which intelligently manage flash memory device wear by periodically rearranging memory blocks so that information stored in relatively inactive memory blocks is relocated to relatively active memory blocks thereby freeing the inactive blocks so they may be written upon. The number of times a block of memory has been erased is also monitored by this type of system software in order to identify which memory blocks are likely to be close to wearing out. However no method exists that determines the exact number of writes that are available to the flash memory.

OBJECTS OF THE INVENTION

The objective of the present invention is to utilize flash memory in such a way as to have the speed of the write cycles be of the same order as the operational speed of the system microprocessor in a given application so as to enhance overall write time performance. Because of the wear associated with the breakdown in the oxide layer of the flash CMOS transistors, it is additionally desired to address the problem of the limited number of write cycles able to be performed upon a flash memory device by designing a flash memory system wherein the writes are performed to the flash memory in such a manner as to evenly distribute wear across the entire flash memory device. It is further desired to perform the read and write cycles to the to the flash memory system so as to function transparently to the system microprocessor.

It is therefore an object of the invention to increase the effective operational bandwidth of an implementation of flash memory.

It is therefore another object to distribute wear evenly upon the flash memory device and thereby increase its operational lifespan.

DETAILED DESCRIPTION OF THE INVENTION

Figure 1:
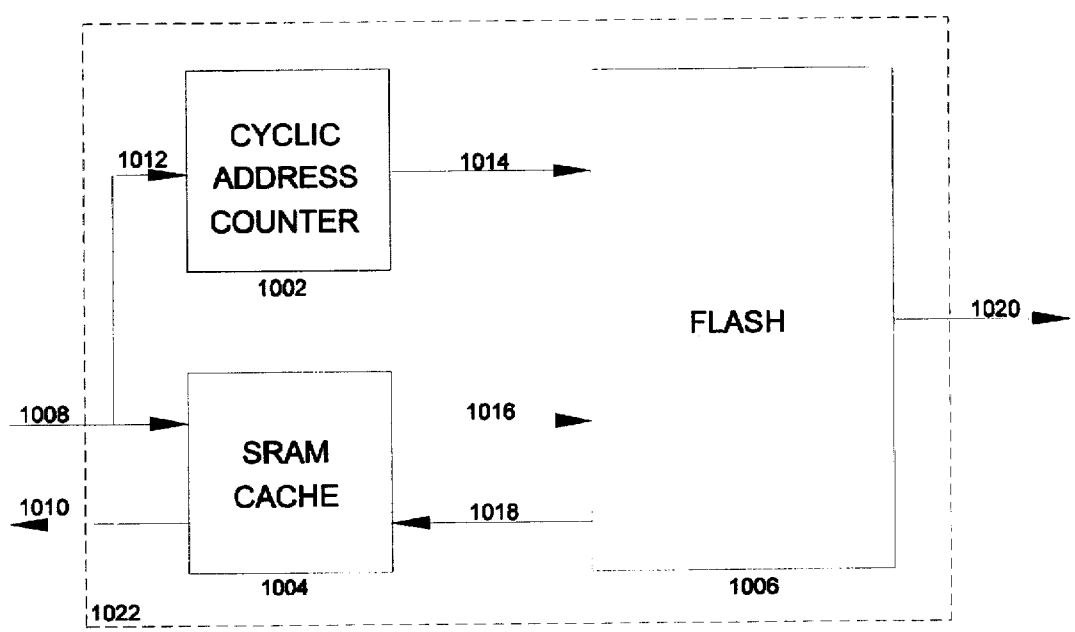
FIG. 1 is a diagram of the electronic configuration of the cache flash memory system circuit arrangement.

FIG. 1 depicts the logical data flow arrangement of the cache flash memory system 1022. The flash memory device 1006 interfaces with the static random access memory device (SRAM) 1004. The SRAM device 1004 acts a memory buffer, or cache, between the system microprocessor (not depicted) and the flash memory. The SRAM device 1004 obtains data from the system microprocessor by obtaining a complete section of memory from the system microprocessor through the data input line 1008. Concurrently with the capture of the section of memory the cyclic address counter 1002 obtains address information from the system microprocessor through address line 1012. The cyclic address counter 1002 tracks the writes to the flash memory device 1006 and determines to what sector on the flash memory device 1006 the newly captured data currently being loaded into the SRAM device 1004 will be written. The cyclic address counter translates linear addresses transparently to the interface with the system microprocessor and controls the writes to the flash memory device 1006 in a linear fashion through address line 1014. The transparent linear address interface ensures that successive writes to the flash memory device 1006 are evenly distributed to all sections of the flash memory 1006 in order to provide even wear of the flash memory cells. Because no area of the flash memory 1006 will be written to more frequently than any other memory area, the operational lifespan of the flash memory device 1006 will be maximized.

The SRAM device 1004 executes a writeback cycle by writing a completely captured section of memory to the flash memory address through data line 1016 as determined by the cyclic address counter 1002. The SRAM device 1004 is capable of accessing the data that was written to the flash memory 1006 through data line 1018. Since the SRAM device 1004 can capture data at a higher rate from the system microprocessor than the flash memory device 1006, the effective write bandwidth of the flash memory device 1006 as viewed from the system microprocessor is increased.

Once data has been saved to the flash memory device 1006 it may be read by the system microprocessor directly through data line 1020. If the data requested by the system microprocessor is contained in the SRAM memory device 1004 the requested data may be read by the system microprocessor through data line 1010.

Figure 2:
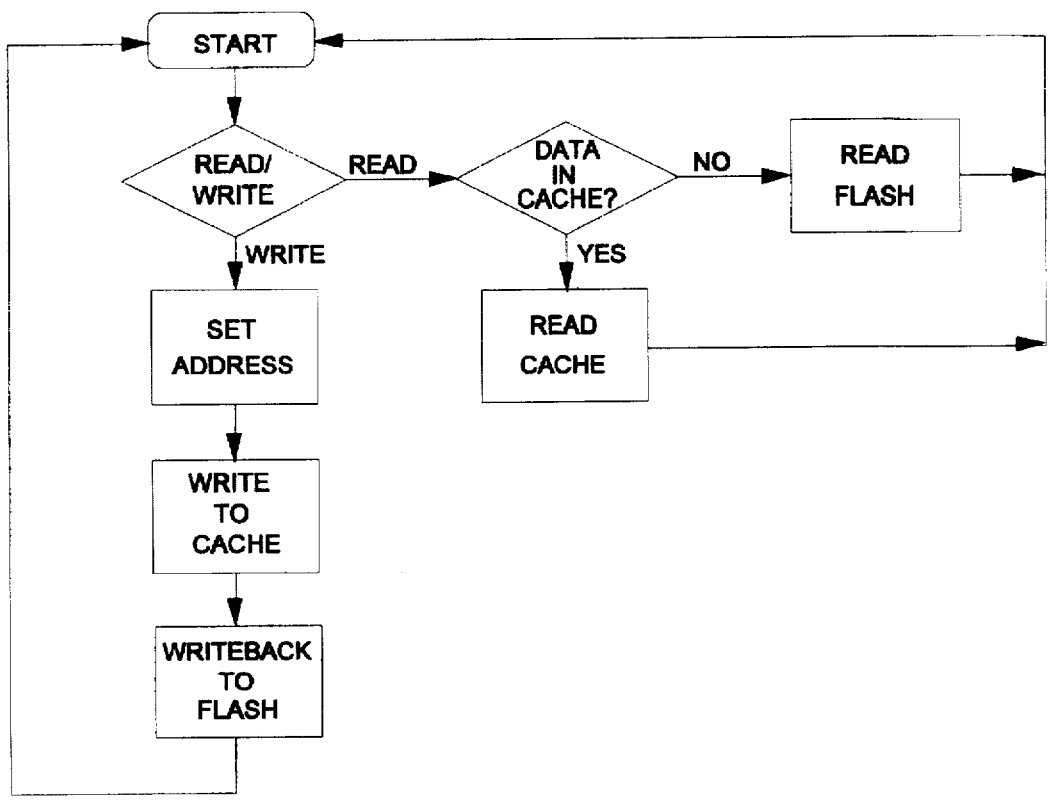
FIG. 2 is a control logic flow diagram sequence to be followed for reading from and writing to the cache flash memory system according to the invention.

FIG. 2 depicts the control logic flow diagram sequence to be followed when data is written to or read from the cache flash memory system 1022. The operation of the read and write sequences are performed within the cache memory system 1022 so that internal memory operations are transparent to the external system microprocessor.

When data is to be written to the cache flash memory system 1022 by the system microprocessor, the flash memory 1006 address is set by the cyclic address counter 1002. The data is then written to and captured by the SRAM device 1004 memory cache. Upon the capture of a complete section of memory by the SRAM device 1004, the memory is written back to the flash memory device 1006 in the location set by the cyclic address counter 1002. The cache flash memory system 1022 is now ready for the next read or write cycle.

If data is to be read from the cache flash system 1022, the data may be read directly from the SRAM device 1004 if therein contained. If the data to be read is stored in the flash memory device 1006 the system microprocessor may read the saved memory directly from the flash device 1006.

In view of the above detailed description of a preferred embodiment and modifications thereof, various other modifications will now become apparent to those skilled in the art. The claims below encompass the disclosed embodiments and all the reasonable modifications and variations without departing from the spirit and scope of the invention.

What is claimed is:

1. An electronic memory system comprising:
   (a) a first memory device means having at least two memory sectors for non-volatile memory storage of data written to the electronic memory system from a microprocessor, said first memory storage device means retaining data without power being supplied thereto;
   (b) a second memory device means for caching data transferred between said first memory device means and the microprocessor; and
   (c) means for monitoring and controlling writes to said first memory storage device means wherein data written to said second memory device means is allocated and written to the memory sectors of said first memory storage device means at a substantially equal frequency for each memory sector thereof.

2. The electronic memory storage system according to claim 1 wherein said first memory device means for non-volatile memory storage includes a flash type memory device.

3. The electronic memory storage system according to claim 1 wherein said second memory storage device means includes means for data transfer and memory capture and storage of sections of memory for writing or reading the data to or from said first memory storage device means.

4. The electronic memory storage system according to claim 1 wherein said means for monitoring and controlling writes to said first memory storage device means includes means for controlling the allocation and distribution of writes to said first memory storage device wherein the distribution of writes to said first memory storage device means is cyclic such that said first memory device means is subject to even wear of the at least two memory sectors thereby maximizing the operational lifespan of said first memory device means.

5. The electronic memory system of claim 1 wherein said second memory storage device means includes an SRAM memory device.

6. An electronic memory system, comprising:
   a first memory that receives and stores data;
   a second memory comprising a plurality of cells that receives and stores data previously stored by said first memory, said second memory being non-volatile; and
   (c) an address translator that receives an address associated with data received by said first memory and determines a destination address in said second memory for storage of data received by said second memory from said first memory such that data is written to said second memory at a substantially equal frequency for each cell thereof.

7. An electronic memory system according to claim 6, wherein said first memory is capable of capturing data at a higher rate than said second memory is capable of capturing data.

8. An electronic memory system according to claim 6, wherein said second memory consumes less power than said first memory.

9. An electronic memory system according to claim 6, wherein a cell of said second memory can be changed fewer times than a cell of said first memory before becoming inoperable.

10. An electronic memory system according to claim 6, wherein said address counter determines the destination address so as to evenly distribute the number of changes made to each cell of said second memory device.

11. An electronic memory system according to claim 6, wherein said address counter determines the destination address so that no area of said second memory is written to more frequently than any other memory area of said second memory.

12. An electronic memory system according to claim 6, wherein the cells of said second memory have a limited operational lifespan and therefore said second memory has a limited second memory operational lifespan, and wherein said address counter determines the destination address so that the limited second memory operational lifespan is maximized.

13. An electronic memory system according to claim 6, wherein said address counter translates the address associated with the data received from said first memory into the destination address in a manner which is transparent to a sending device which is sending data to the electronic memory system.

14. An electronic memory system according to claim 6, wherein said first memory comprises a static random access memory.

15. An electronic memory system according to claim 6, wherein said second memory comprises a flash memory.

16. An electronic memory system according to claim 6, wherein a complete section of data is received by said second memory from said first memory during each transfer of data.

17. An electronic memory system, comprising:
   (a) a first memory component, having at least two memory sectors, that provides non-volatile storage of data, the data having been communicated to the electronic memory system from a microprocessor;
   (b) a second memory component that provides initial storage of the data transferred from the microprocessor, said second memory component serving to hold the data for subsequent transfer to said first memory device; and
   (c) an address counter that monitors and controls storage of the data by the electronic data system, said address counter coordinating transfer of data to said first memory component wherein data written to said second memory component is allocated and written to the memory sectors of said first memory component at a substantially equal frequency for each memory sector thereof.

18. A method for storing data in an electronic memory system, comprising the steps of:
   (a) storing received data in a memory component;
   (b) concurrently receiving, by an address counter, an address associated with the received data;
   (c) translating the address into a destination address, the destination address specifying a location in a non-volatile memory component, the destination address being selected so as to maximize the operational lifespan of said non-volatile memory component; and
   (d) transferring said received data from said memory component into said non-volatile memory component for storage in said non-volatile memory component.

* * * * *

UNITED STATES PATENT AND TRADEMARK OFFICE
CERTIFICATE OF CORRECTION

| | | |
|---|---|---|
| PATENT NO. | : 5,726,937 | Page 1 of 1 |
| APPLICATION NO. | : 08/653377 | |
| DATED | : March 10, 1998 | |
| INVENTOR(S) | : Beard | |

It is certified that error appears in the above-identified patent and that said Letters Patent is hereby corrected as shown below:

Column 1, line 8, delete "DN38053Y," and insert -- DN 38053Y, --.

Column 5, line 46, in Claim 6, delete "a first" and insert -- (a) a first --.

Column 5, line 47, in Claim 6, delete "a second" and insert -- (b) a second --.

Column 6, line 53, in Claim 18, delete "off" and insert -- of: --.

Signed and Sealed this
Eighth Day of November, 2011

David J. Kappos
*Director of the United States Patent and Trademark Office*